(12) United States Patent
Antanouski

(10) Patent No.: US 7,465,925 B2
(45) Date of Patent: Dec. 16, 2008

(54) PERSONAL RADIATION DETECTOR AND METHOD OF OPERATION OF SAME

(76) Inventor: Aliaksandr A. Antanouski, deceased, late of Minsk (BY); by Ludmila Antanovskaya, legal representative, C/O International Legal Counsels, 901 N. Pitt Street, Suite 325, Alexandria, VA (US) 22314

( * ) Notice: Subject to any disclaimer, the term of this patent is extended or adjusted under 35 U.S.C. 154(b) by 14 days.

(21) Appl. No.: 11/473,170

(22) Filed: Jun. 22, 2006

(65) Prior Publication Data

US 2007/0295904 A1 Dec. 27, 2007

(30) Foreign Application Priority Data

Mar. 15, 2006 (EA) ............................... 200600421

(51) Int. Cl.
*G01T 1/36* (2006.01)
(52) U.S. Cl. .................................................. 250/336.1
(58) Field of Classification Search ............... 250/336.1
See application file for complete search history.

(56) References Cited

U.S. PATENT DOCUMENTS

| 5,218,208 | A | * | 6/1993 | Augier et al. | ............ | 250/363.02 |
|---|---|---|---|---|---|---|
| 2004/0119591 | A1 | | 6/2004 | Peeters | | |
| 2004/0232323 | A1 | * | 11/2004 | Bosco et al. | ................. | 250/253 |
| 2005/0121618 | A1 | * | 6/2005 | Fowler et al. | ............... | 250/394 |
| 2005/0127300 | A1 | * | 6/2005 | Bordynuik | .............. | 250/361 R |
| 2007/0075251 | A1 | * | 4/2007 | Doughty et al. | ........ | 250/370.01 |

FOREIGN PATENT DOCUMENTS

WO 2005/109336 11/2005

\* cited by examiner

*Primary Examiner*—David P Porta
*Assistant Examiner*—Marcus H Taningco
(74) *Attorney, Agent, or Firm*—Bardmesser Law Group

(57) ABSTRACT

A multipurpose, small-sized, ergonomic device determines and measures ionizing radiation and stores the obtained data for subsequent processing. An ionizing radiation detector is used as a sensing unit and is connected with a microcontroller by a converter. The device contains a nonvolatile memory for data arrangement and command set and an interface for connection with a computer. Measurements are carried out constantly, records are made periodically by the user setting. In the case of a value current or accumulated established criterion level excess, the device gives an alert signal and stores current value, not waiting for periodic write time. At connection with a computer, these data are automatically transferred to the computer and processed for identification and saving.

21 Claims, 2 Drawing Sheets

PERSONAL RADIATION DETECTOR AND METHOD OF OPERATION OF SAME

Figure 1:
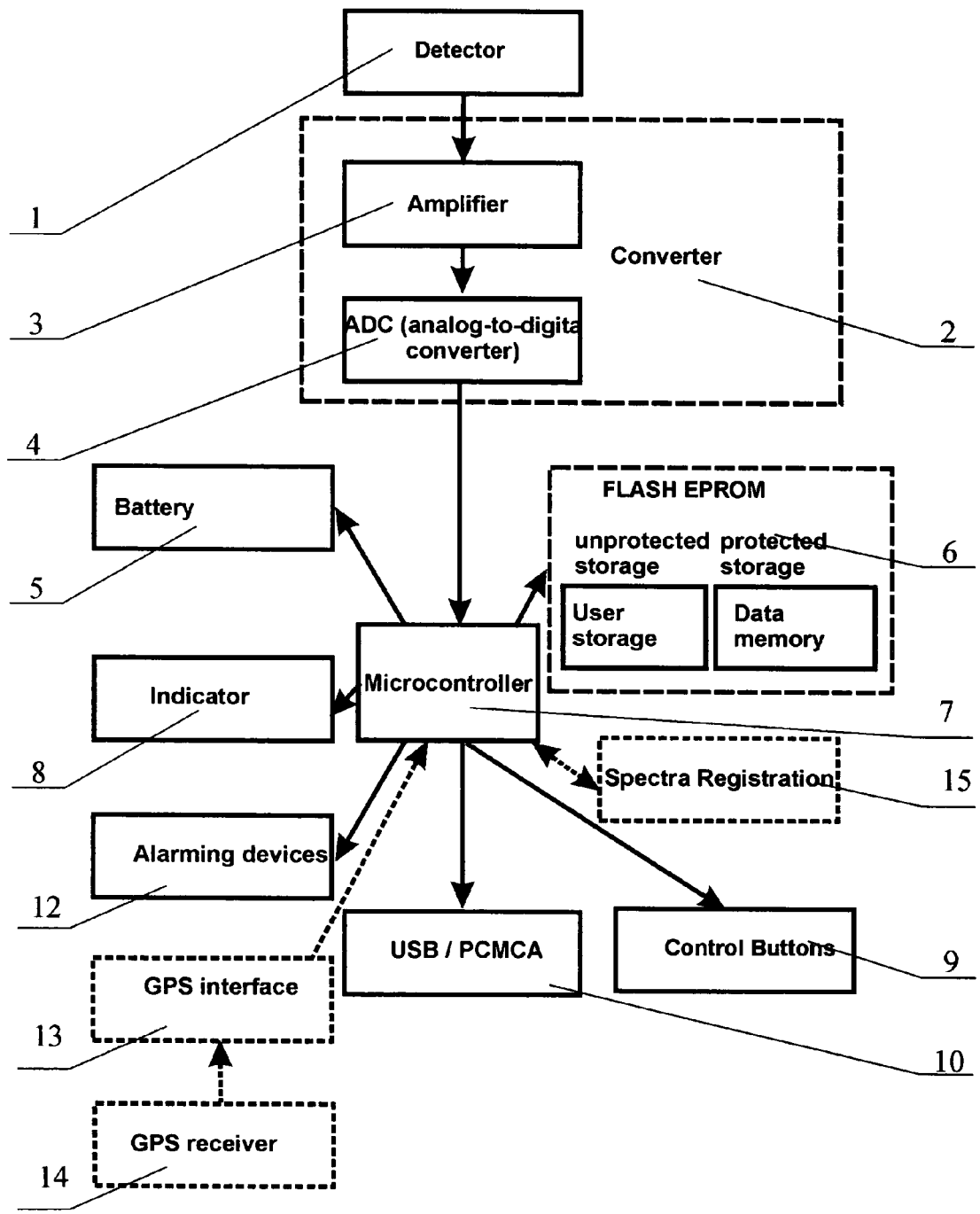

This invention relates to a personal radiation detector and to a method of operating the same.

A known portable medical data device, as described in European application for patent WO05109336, allows a user to accumulate and change individual and medical information contained in the portable device. The device includes a storage element with a standard computer interface, preferably, a USB port. The data is systematized that enables the user to enter information on the user's case history and data from a storage element as well as an image for the further case history completion. The device allows medical personnel to obtain access to the necessary information on the patient easily and in proper time. The storage element also contains the software necessary for data processing and visualization.

The deficiency of this known device is an impossibility of detecting any external radiation which may be hazardous for individual health. With this device, the user uploads the information from a computer, i.e., the device saves only the uploaded information in the form of medical cards.

Also known is a device for global network of monitoring of possible personal threat and terrorist activity as described in published US patent application 2004/0119591 Al, Published Jun. 24, 2004. This device is to be used for the detection of chemical, radiological or biological threats by means of a modified personal wireless device with a built-in chemical, radiological or biological threat detector.

The wireless device includes functional telecommunication and sensitive modules, a sensor for pollutant detection, a device for two-side communication, an overflow signal indicator, a microprocessor or a microcontroller for control and transmission of pollutant signal. The method of global network of terrorist and personal threat tracing includes an operation sequence of environmental contamination level detection, ionizing radiation level calculation and warning and transmission of these signals by mobile communication in the case of ionizing radiation level excess.

The deficiency of the device is complexity and, therefore, expensiveness of the device. Moreover, this device cannot accumulate and store the obtained data for subsequent analysis; and the device does not allow the usual user to process obtained data but only transmits the data to a remote data terminal.

Briefly, the invention provides a multipurpose, small-sized, ergonomic device that allows the detection and measurement of ionizing radiation as well as the maintaining of the data and the subsequent presentation of the obtained data for processing.

The ergonomic device includes a sensitive module which comprises, at least, one sensitive sensor for pollutant detection in the environment; a control system with a microcontroller for sensitive module operating; an alert device for warning in case the pollutant level exceeds a preset threshold; a power supply; and control buttons. According to the invention, an ionizing radiation detector is used as the sensitive module and is connected with the microcontroller by means of a converter. In addition, the device contains a nonvolatile memory for data arrangement and command set, and an interface for connection with a computer.

The ionizing radiation detector may be a gas-discharge proportional counter, a GM counter, a semiconductor sensor or a scintillation sensor.

The computer interface may be a USB interface or a PCM-CIA interface.

The nonvolatile memory is split into a memory that is available to a user for writing any computer files and a protected memory access to which can be realized only by means of commands written in the nonvolatile memory or in an attached computer.

The protected nonvolatile memory is organized in the form of values array automatically measured by the device and supplied with sample time marks The device may also include a module with a GPS receiver with the protected nonvolatile memory being organized in the form of values array automatically measured by the device and supplied with sample time and location read outs from the GPS receiver.

The device may also include a device for registration of the energy distribution of the measured radiation with the protected nonvolatile memory being organized in the form of values array automatically measured by this registration device.

The command set stored in the nonvolatile memory ensures automatic transmission to a computer memory of the values array automatically measured by the device and supplied with time and location read outs when the device is connected to a computer.

The command set contains commands of user identification and is automatically updated during communication of the ergonomic device with a computer.

The invention also provides a method that includes the following sequence operations:
  detection of environment contamination level
  calculation of ionizing radiation level and
  warning in case of ionizing radiation level excess In accordance with the invention, the measurements are carried out constantly and records are made periodically by the user setting. In the case of a value current or accumulated established criterion level excess, the device gives an alarm signal and stores current value, not waiting for periodic write time. Also, upon installing a connection with a computer, these data are automatically transferred into the computer and processed for identification and saving.

The method also provides for the storing of an irradiation energy spectrum.

The alarm signal is given in the form of light and/or sound, and/or vibration.

Upon connection to a computer, the user identification is done, and the computer data base can be updated from the nonvolatile memory into the computer memory and command set updates are realized in the nonvolatile memory.

The ionizing radiation measuring device can be used for detection and identification of ionizing radiation indoors and outdoors as well as by technicians of radiological and radioactivity laboratories, emergency services, and also by experts of different industries, agriculture, transport, medicine, and the like where nuclear power technical installations and ionizing radiation sources are used, and also at terrorist threat detection.

The device can be used in a system for radioactive materials identification by means of accumulated photon radiation scintillation spectra analysis.

The device is intended for detection and registration of ionizing radiation on an individual, and also for detection of radiation contamination of environment and objects, including food.

Figure 2:
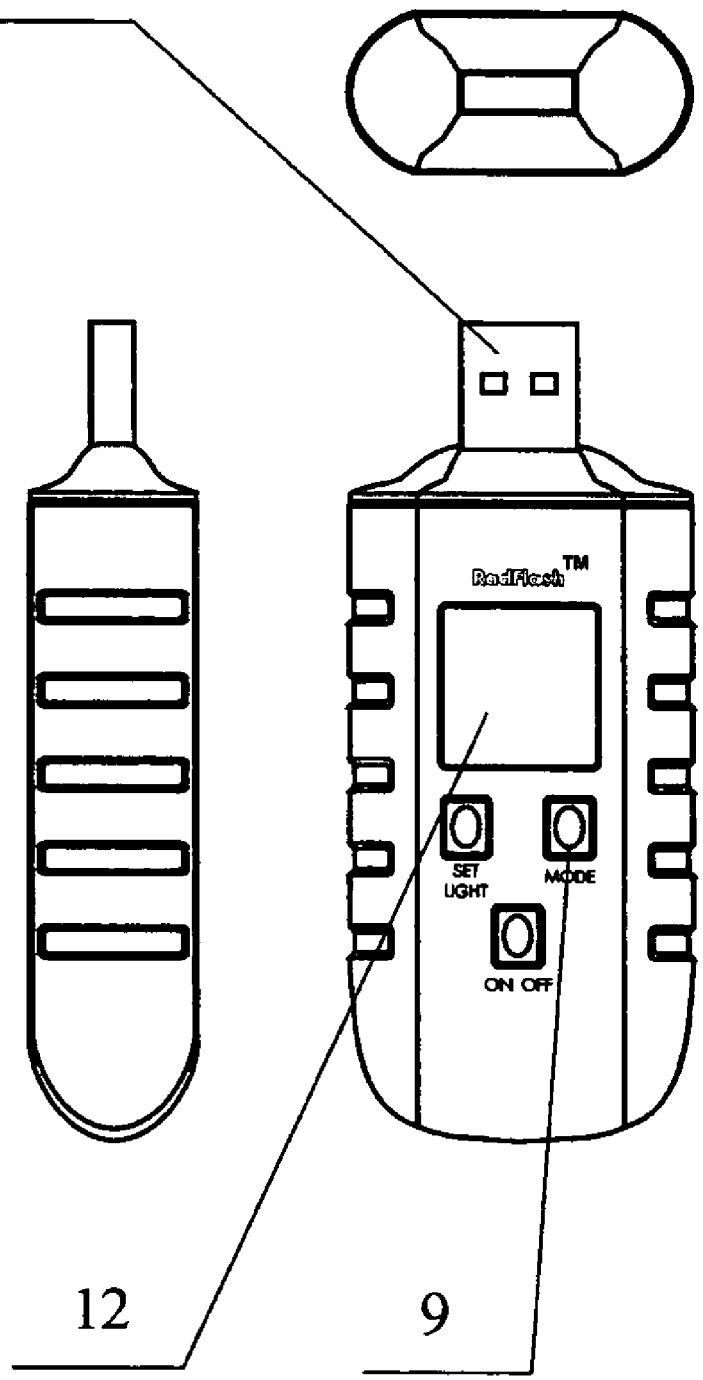

These and other objects and advantages will become more apparent from the following detailed description taken in conjunction with the accompanying drawings in which:

FIG. 1 illustrates a block diagram of the personal wireless device of the invention; and FIG. 2 illustrates three views of the device of the personal wireless device of the invention Referring to the drawings, the personal radiation detector comprises an ionizing radiation detector (sensor) 1 as, for example, a scintillation sensor, a converter 2 including an amplifier 3 and an ADC 4 analog/digital converter, power element in the form of a battery 5, a nonvolatile memory 6, a microcontroller 7, an indicator 8, control buttons 9, an interface 10 realized, for example, in the form of an USB port 11 (see FIG. 2) and an alarming device 12.

The detector may additionally comprise a module 13 with a global satellite positioning system receiver 14 and a module for the registration of the measured radiation energy distribution 15.

The detector operates in the following way. The transformation of gamma quanta in electrical impulses proportional to gamma quanta energies takes place in the detector 1. Impulses from the detector 1 come into the converter 2 inlet, and after amplification to the ADC 4.

The analog-to-digital converter 4 transforms an analog signal to a digital signal.

The data coming from the analog-digital converter 4 is processed by the microcontroller 7.

The operation history of the detector, the accumulated spectra, as well as the series of service parameters and coefficients, including sampling times, coordinates of samplings place of if necessary and opportunities, and identification user number are saved in the nonvolatile memory 6.

The special software for a personal computer (PC) is also saved in the nonvolatile memory 6. After connection of the detector via the USB or PCMCIA interface 10 to the computer, the program is installed in the PC. By means of this software, the information stored in the nonvolatile memory 6 is automatically read out in the PC, and then is processed. The program allows an analysis of the spectra that are read off the detector and the identification of isotopes according to the accumulated spectra. The program also allows a read out in real-time of current outcomes from the detector connected to the PC and the spectra accumulation and processing.

The nonvolatile memory 6 can be split, as shown, in the form of a protected area in which information on radiation is automatically recorded and a removable computer disk.

The power supply element 5 ensures that the device functions in an autonomous mode and provides an energy supply for the ionizing radiation sensor, microcontroller 7 and measured data record in the nonvolatile memory 6.

In response to a current or accumulated level excess of ionizing radiation, the indicator 8 gives one or several signals,—light, beep and/or vibration signals. Control buttons 9 are necessary to turn off the alarming signal and can be used execute other auxiliary functions specified by a manufacturer.

The software stored in the nonvolatile memory 6 can be automatically updated at the time of connection to a computer.

Identification of isotopes based on the accumulated spectra may be performed by means of a special service allocated in an Internet web site in case the identification cannot be carried out locally at the user computer. The Internet-service allows updating the software and spectra bases for any user who has been connected to this service.

The invention thus provides an inexpensive device, available for any user, that can be used for the detection and identification of ionizing radiation.

The invention also allows the data that has been received and stored to be processed automatically every time the detector is connected to a computer.

What is claimed is:

1. A personal radiation detector comprising:
   at least one ionizing radiation scintillation sensor for generating analog impulses representative of a detected radiation in an environment;
   a converter connected to the sensor for converting the impulses to digital signals;
   a microcontroller connected to the converter to receive the digital signals therefrom;
   a nonvolatile memory connected to the microcontroller for data arrangement and command set,
   an alarm device connected to the microcontroller for emitting warning signal in response to the detected radiation exceeding a preset level;
   a power supply connected to the microcontroller for energizing the microcontroller;
   a housing enclosing the sensor, the converter, the memory, the microcontroller, and the power supply, the housing having a form factor that substantially fits in a human palm; and
   an interface for connecting the microcontroller with a computer,
   wherein the detector can operate autonomously and without being connected to the computer, and
   wherein, when connected to the computer, the detector acts as a plug-and-play device.

2. The personal radiation detector of claim 1, wherein the interface is one of a USB port and a PCMCIA interface.

3. The personal radiation detector of claim 1, wherein the nonvolatile memory is split into a first memory for storing computer files, which functions as a flash drive, and a second protected memory.

4. The personal radiation detector of claim 3, wherein the nonvolatile memory has a stored command for accessing the second protected memory.

5. The personal radiation detector of claim 3, wherein the second protected memory is characterized in being accessible from a computer connected to the interface.

6. The personal radiation detector of claim 3, wherein the second protected memory is organized in the form of automatically measured values array and supplied with sample time marks.

7. The detector of claim 3, further comprising a USB connector for directly connecting the detector to the computer.

8. The personal radiation detector of claim 1, further comprising a module with a GPS receiver, and wherein the second protected nonvolatile memory is organized in the form of automatically measured values array and supplied with sample time and location checks read out from the GPS receiver.

9. The personal radiation detector of claim 1, further comprising a module for the registration of the measured radiation energy distribution and the second protected nonvolatile memory is organized in the form automatically measured values array.

10. The personal radiation detector of claim 1, wherein the nonvolatile memory has a command set stored therein for automatically transmitting automatically measured values array and time and location checks to a computer memory upon connection to the computer.

11. The personal radiation detector of claim 10, wherein the command set contains commands of user identification.

12. The personal radiation detector as set forth in claim 10 wherein the command set is automatically updated in response to communication with a computer.

13. The detector of claim 1, wherein the housing further includes a display indicating the detected radiation.

14. The detector of claim 1, wherein the radioisotope identification is performed by a service located on an Internet server, based on the detected radiation.

15. The detector of claim 1, further comprising a USB connector for directly connecting the detector to the computer.

16. A method of operation of a personal radiation detector comprising the steps of:
- constantly detecting an environment contamination level using a scintillation sensor;
- constantly calculating an ionizing radiation level of the detected contamination level;
- issuing a warning in response to the ionizing radiation level exceeding a preset level;
- periodically recording records of the calculated ionizing radiation levels at predetermined periodic recording times;
- issuing an alert signal and storing the current value in response to one of a current value and an accumulated value of the ionizing radiation level exceeding an established criterion level without waiting for a periodic recording time; and
- automatically transferring the stored data to a computer for processing of the data for identification and saving,
- wherein the transfer of the stored data occurs upon connection of a detector to the computer, the detector being configured as a plug-and-play device.

17. The method of claim 16, further comprising the step of storing a measured irradiation energy spectrum.

18. The method of claim 16, wherein the alert signal is in the form of at least one of light, sound and vibration.

19. The method of claim 16, further comprising the steps of identifying a user in response to connection of the personal radiation detector to a computer, updating a data base in a memory of the computer from a nonvolatile memory in the personal radiation detector and updating command sets in the nonvolatile memory of the personal radiation detector in response to connection of the personal radiation detector to a computer.

20. A palm-size personal radiation detector comprising:
- an ionizing radiation scintillation sensor that detects radiation spectrum and produces signals corresponding to the spectrum;
- a microcontroller capable of receiving the signals and analyzing the spectrum and the radioisotopes that emit the radiation;
- a power supply connected to the microcontroller and to the radiation sensor;
- a housing enclosing the sensor, the microcontroller, and the power supply, the housing having a form factor that substantially fits in a human palm;
- a display on the housing showing information about the detected radiation, the display being controlled by the microprocessor; and
- an interface for connecting the microcontroller to a computer,
- wherein the personal radiation detector can operate without being connected to the computer, and
- wherein, when connected to the computer, the detector acts as a plug-and-play device.

21. The detector of claim 20, further comprising a USB connector for directly connecting the detector to the computer.

* * * * *